Patented Nov. 24, 1942

2,302,955

UNITED STATES PATENT OFFICE 2,302,955

P-SULPHONAMIDE-BENZENE-AZO DERIVATIVES

George W. Raiziss, Le Roy W. Clemence, Marie Severac, and John C. Moetsch, Philadelphia, Pa., assignors to Abbott Laboratories, North Chicago, Ill., a corporation of Illinois No Drawing. Application June 1, 1937, Serial No. 145,804

3 Claims. (Cl. 260—196)

The present invention relates to a group of compounds which are of value in the treatment of blood stream infections caused by pathogenic micro-organisms and particularly infections caused by streptococcus hemolyticus.

The compounds of our invention may be classed broadly as p-sulphonamide-benzene-azo-derivatives and include the various phenol, cresol and naphthol derivatives. The compounds are prepared by diazotizing p-amino-benzene-sulphonamide and coupling the diazo body to the desired phenol, cresol or naphthol derivative as fully described in the examples found hereinafter.

We are aware that certain azo dye stuffs have previously been suggested for use in the treatment of blood infections, but as far as we have been able to ascertain, the compounds prepared by us and included in our invention are novel and their utility has been proven by many biological tests. We have discovered that the compounds formed by coupling the diazotized p-amino-benzene-sulphonamide with naphthol sulphonic acids are particularly potent and posses medicinal properties not found in the other type derivatives. Of somewhat less potency although possessing very valuable properties are the compounds formed by coupling the naphthyl amine sulphonic acids to the diazo body. We have also discovered that the alkylated hydroxy aromatic p-sulphonamide-azo derivatives, and particularly the compounds having alkyl groups containing 5 carbon atoms are potent. The coupling of the diazotized body to halogenated and particularly chlorinated phenols and cresols also results in azo dye stuffs possessing curative properties long desired in the medical field.

The principal object of our invention is to provide potent azo dye stuffs that possess unique properties making them particularly adaptable for use in the treatment of blood infections.

Other objects will be apparent as the description hereinafter proceeds.

The compounds of our invention have the following formula:

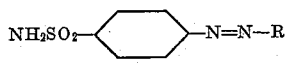

in which R is selected from the goup comprising naphthylamine sulphonic acids, naphthols and hydroxy aromatics containing alkyl, phenol, sulphonic acid, halogen and carboxylic groups.

The following examples will serve for illustrative purposes.

PHENOL DERIVATIVES

*Example 1.— p-Sulphonamide-benzene-azo-o-phenyl-phenol.*—To 10.4 grams of p-sulphonamide-amino-benzene hydrochloride dissolved in 50 c. c. of water 7.5 c. c. of concentrated hydrochloric acid is slowly added and the mixture cooled to about 0° C. The mixture is next diazotized in the usual manner with 3.5 grams of sodium nitrite dissolved in 20 c. c. of water and is then coupled with 8.5 grams of o-phenyl-phenol in 100 c. c. of water containing 8 grams of caustic soda. The resulting deep red solution is acidified with hydrocholoric acid and the brownish sticky mass which separates is congealed into a solid by trituration with cold water. The product is finally washed with water and dried in a vacuum desiccator.

*Example 2.— p-Sulphonamide-benzene-azo-p-phenyl-phenol.*—This product may be prepared using p-phenyl-phenol in a manner similar to the process described in Example 1.

*Example 3.— p-Sulphonamide-benzene-azo-p-tertiary-amyl-phenol.*—This product may also be prepared using p-tertiary amyl phenol in a manner similar to the process described in Example 1.

*Example 4.—p-Sulphonamide-benzene-azo-di-amyl-phenol.*—This product may also be prepared using diamyl phenol in a manner similar to the process described in Example 1.

*Example 5.— p-Sulphonamide-benzene-azo-phenol-sulphonic acid.*—To 8.6 grams of p-amino-benzene-sulphonamide dissolved in 100 c. c. of ice water 9.5 c. c. of concentrated hydrochloric acid is added. The mixture is maintained at about 0° C. and is diazotized in the usual manner with an aqueous solution containing 3.5 grams of sodium nitrite. The diazo solution is next coupled with 8.7 grams of sodium phenol sulphonate dissolved in 100 c. c. of water containing 4 grams of caustic soda. The resulting deep colored solution is cooled and then acidified with hydrochloric acid. The gummy precipitate which crystallizes on standing is washed with water and dried in vacuo.

CRESOL DERIVATIVES

*Example 6.—p-Sulphonamide-benzene-azo-α-ethyl-propyl-o-cresol.*—To 8.7 grams of p-amino benzene-sulphonamide dissolved in 100 c. c. of water 9.5 c. c. of concentrated hydrochloric acid is added. The mixture is next diazotized at 0° C. in the usual manner with 3.5 grams of sodium nitrite dissolved in 25 c. c. of water and then coupled with 9 grams of α-ethyl-propyl-o-cresol in 100 c. c. of water containing 8 grams of caustic soda. The resulting red colored solution is stirred and cooled and then acidified with hydrochloric acid. The gummy reddish brown precipitate is triturated and washed repeatedly with water and finally dried in vacuum until the gum becomes a hard mass which can be powdered.

Example 7.—p-Sulphonamide-benzene-azo-α-ethyl-propyl-m-cresol.—This product may be prepared by coupling α-ethyl-propyl-m-cresol to the diazotized p-amino benzene sulphonamide in a manner similar to the process described in Example 6.

Example 8.—p-Sulphonamide-benzene-azo-α-ethyl-propyl-p-cresol.—This product may also be prepared using α-ethyl-propyl-p-cresol in a manner similar to the process described in Example 6.

Example 9.—p-Sulphonamide-benzene-azo-2-methyl-butyl-o-cresol.—This product may also be prepared using 2-methyl-butyl-o-cresol in a manner similar to the process described in Example 6.

Example 10.—p-Sulphonamide-benzene-azo-2-methyl-butyl-m-cresol.—This product may also be prepared using 2-methyl-butyl-m-cresol in a manner similar to the process described in Example 6.

Example 11.—p-Sulphonamide-benzene-azo-isoamyl-o-cresol.—This product may also be prepared using 8 grams of isoamyl-o-cresol in a manner similar to the process described in Example 6.

Example 12.—p-Sulphonamide-benzene-azo-thymol.—This product may also be prepared using thymol (p-isopropyl-m-cresol) in a manner similar to the process described in Example 6.

Example 13.—p-Sulphonamide-benzene-azo-xylenol.—This product may also be prepared using 6.1 grams of xylenol (methyl cresol) in a manner similar to the process described in Example 6.

NAPHTHYLAMINE DERIVATIVES

Example 14.—p-Sulphonamide-benzene-azo-1-naphthylamine-4-sulphonic acid.—To 8.6 grams of p-amino-benzene-sulphonamide dissolved in 100 c. c. of ice water, 9.5 c. c. of concentrated hydrochloric acid is added. The solution is maintained at about 0° C. and is diazotized in the usual manner with an aqueous solution containing 3.5 grams of sodium nitrite. The diazo solution is next coupled with 12.4 grams of sodium naphthionate dissolved in 100 c. c. of water containing 4 grams of caustic soda. The resulting deep colored solution is cooled and then acidified with hydrochloric acid. The precipitate is thoroughly washed with water and finally dried in vacuo.

Example 15.—p-Sulphonamide-benzene-azo-1-naphthylamine-5-sulphonic acid.—This product may be prepared by coupling 1-naphthylamine-5-sulphonic acid (Laurent's acid) dissolved in 100 c. c. of water containing 8 grams of caustic to the diazotized p-amine-benzene-sulphonamide in a manner similar to the process described in Example 14.

Example 16.—p-Sulphonamide-benzene-azo-2-naphthylamine-6-sulphonic acid.—This product may also be prepared by using 2-naphtylamine-6-sulphonic acid (Broenner's acid) in a manner similar to the process described in Example 15.

NAPHTHOL DERIVATIVES

Example 17.—p-Sulphonamide-benzene-azo-1-naphthol-4-sulphonic acid.—This product may also be prepared using 1-naphthol-4-sulphonic acid in a manner similar to the process described in Example 14.

Example 18.—p-Sulphonamide-benzene-azo-1-naphthol-5-sulphonic acid.—This product may also be prepared using 1-naphthol-5-sulphonic acid in a manner similar to the process described in Example 14.

Example 19.—p-Sulphonamide-benzene-azo-2-naphthol-6-sulphonic acid.—This product may also be prepared using 2-naphthol-6-sulphonic acid in a manner similar to the process described in Example 14.

Example 20.—p-Sulphonamide-benzene-azo-2-naphthol-3-6-disulphonic acid.—This product may also be prepared using 2-naphthol-3-6-disulphonic acid in a manner similar to the process described in Example 14.

Example 21.—p-Sulphonamide-benzene-azo-2-naphthol-6-8-disulphonic acid.—This product may also be prepared using 2-naphthol-6-8-disulphonic acid in a manner similar to the process described in Example 14.

Example 22.—p-Sulphonamide-benzene-azo-tertiary-amyl-β-naphthol.—This product may also be prepared using tertiary-amyl-β-naphthol in a manner similar to the process described in Example 6.

Example 23.—p-Sulphonamide-benzene-azo-α-naphthol.—This product may also be prepared using α-naphthol in a manner similar to the process described in Example 1.

Example 24.—p-Sulphonamide-benzene-azo-β-naphthol.—This product may also be prepared using β-naphthol in a manner similar to the process described in Example 1.

HALOGENATED DERIVATIVES

Example 25.—p-Sulphonamide-benzene-azo-chloro-phenol.—To 8.6 grams of p-amino-benzene-sulphonamide dissolved in 100 c. c. of ice water, 9.5 c. c. of concentrated hydrochloric acid is added. The solution is maintained at about 0° C. and is diazotized in the usual manner with an aqueous solution containing 3.5 grams of sodium nitrite. The diazo solution is next coupled with 6.4 grams of p-chloro-phenol dissolved in 100 c. c. of water containing 8 grams of caustic soda. The resulting solution is cooled and then acidified with hydrochloric acid. The tarry precipitate is triturated and washed with water and finally thoroughly dried in a vacuum desiccator.

Example 26.—p-Sulphonamide-benzene-azo-p-bromo-phenol.—This product may be prepared by coupling 8.7 grams of p-bromo-phenol to the diazotized p-amino-benzene-sulphonamide in a manner similar to the process described in Example 25.

Example 27.—p-Sulphonamide-benzene-azo-chloro-resorcinol.—This product may also be prepared by using chloro resorcinol (chloro-m-hydroxy phenol) in a manner similar to the process described in Example 25.

Example 28.—p-Sulphonamide-benzene-azo-p-chloro-m-cresol.—This product may also be prepared by using 7.1 grams of p-chloro-m-cresol in a manner similar to the process described in Example 25.

CARBOXYLIC ACID DERIVATIVES

Example 29.—p-Sulphonamide-benzene-azo-salicylic acid.—This product may be prepared by coupling 6.9 grams of salicylic acid (hydroxy benzoic acid) to the diazo body in a manner similar to the process described in Example 15.

In the above examples the use of hydroxy aromatic sulphonic acids and particularly the naphthol sulphonic acids as the coupling agent produces compounds of extremely high potency. The naphthionic acids or naphthylamine sulphonic acids also produce preferred products although of less potency than the naphthol derivatives. In the alkylated hydroxy aromatics, the 5 carbon alkyl groups are potent, the various 2-methyl-butyl-cresols being the preferred products. Of the halogenated hydroxy aromatics the p-chloro-phenol and p-chloro-cresol are preferred because of their therapeutic effect in streptococcic infections.

The novel compounds of our invention are all stable compounds substantially insoluble in water but fairly soluble in dilute sodium hydroxide. The azo compounds, such as described above, have been tested and found to be of great value in treating various blood infections and particularly infections caused by streptococcus hemolyticus.

While we have illustrated our invention with appropriate examples, it will be understood by those skilled in the art that our invention is not limited thereto. All variations coming within the true spirit and scope of our invention are intended to be covered by the claims appended hereto.

We claim:

1. p-Sulphonamide-benzene - azo - naphthylamine sulphonic acids.
2. p-Sulphonamide-benzene-azo-1 - naphthylamine-4-sulphonic acid.
3. p-Sulphonamide-benzene-azo-1 - naphthylamine-5-sulphonic acid.

GEORGE W. RAIZISS.
LE ROY W. CLEMENCE.
MARIE SEVERAC.
JOHN C. MOETSCH.